US008942561B2

(12) United States Patent
Boyd et al.

(10) Patent No.: US 8,942,561 B2
(45) Date of Patent: Jan. 27, 2015

(54) SYNCHRONIZATION TRANSPORT OVER PASSIVE OPTICAL NETWORKS

(75) Inventors: Edward W. Boyd, Petaluma, CA (US); Hidehiko Shibuya, Tokyo (JP)

(73) Assignee: Broadcom Corporation, Irvine, CA (US)

(*) Notice: Subject to any disclaimer, the term of this patent is extended or adjusted under 35 U.S.C. 154(b) by 632 days.

(21) Appl. No.: 12/574,083

(22) Filed: Oct. 6, 2009

(65) Prior Publication Data
US 2010/0098433 A1   Apr. 22, 2010

Related U.S. Application Data

(60) Provisional application No. 61/107,256, filed on Oct. 21, 2008.

(51) Int. Cl.
*H04B 10/00* (2013.01)
*H04Q 11/00* (2006.01)
*H04J 3/06* (2006.01)

(52) U.S. Cl.
CPC .......... *H04Q 11/0067* (2013.01); *H04J 3/0658* (2013.01); *H04J 3/0667* (2013.01); *H04Q 2011/0079* (2013.01)
USPC .............................. 398/72; 398/154; 398/155

(58) Field of Classification Search
USPC ...................... 398/66–73, 154–155
See application file for complete search history.

(56) References Cited

U.S. PATENT DOCUMENTS

| 5,509,003 | A * | 4/1996 | Snijders et al. | 370/294 |
| 6,798,790 | B1 * | 9/2004 | Enssle et al. | 370/503 |
| 7,385,995 | B2 * | 6/2008 | Stiscia et al. | 370/412 |
| 7,590,139 | B2 * | 9/2009 | Boyd et al. | 370/442 |
| 7,733,886 | B2 * | 6/2010 | Choi et al. | 370/401 |
| 8,027,586 | B2 * | 9/2011 | Ikeda et al. | 398/70 |

(Continued)

FOREIGN PATENT DOCUMENTS

| JP | 2007-201842 A | 8/2007 |
| WO | WO 2010/047968 A2 | 4/2010 |

OTHER PUBLICATIONS

Written Opinion of the International Searching Authority directed toward related International Patent Application No. PCT/US2009/060034, Korean Intellectual Property Office, Daejeon, Republic of Korea, mailed Apr. 20, 2010; 4 pages.

(Continued)

*Primary Examiner* — Agustin Bello
(74) *Attorney, Agent, or Firm* — Sterne, Kessler, Goldstein & Fox P.L.L.C.

(57) ABSTRACT

One embodiment provides an Ethernet Passive Optical Network (EPON) system for clock transport. The system includes a reference clock configured to generate a frequency-reference signal, an optical line terminal (OLT) coupled to the reference clock, and an optical network unit (ONU). The OLT includes a clock generator configured to generate an OLT clock based on at least the frequency-reference signal. The ONU includes an optical transceiver, a clock recovery module, and a clock output mechanism. The optical transceiver is configured to transmit optical signals to and receive optical signals from the OLT. The clock-recovery module is configured to recover the frequency-reference signal from the received optical signals. The clock output mechanism is configured to output the recovered frequency-reference signal, thus facilitating transport of the frequency-reference signal over the EPON.

17 Claims, 7 Drawing Sheets

(56) References Cited

U.S. PATENT DOCUMENTS

| | | | |
|---|---|---|---|
| 8,126,333 B2* | 2/2012 | Horiuchi | 398/102 |
| 2002/0006190 A1 | 1/2002 | Peeters et al. | |
| 2002/0136232 A1 | 9/2002 | Dudziak et al. | |
| 2004/0109688 A1* | 6/2004 | Kim et al. | 398/68 |
| 2006/0133809 A1* | 6/2006 | Chow et al. | 398/66 |
| 2006/0209901 A1 | 9/2006 | Kim | |
| 2007/0116467 A1* | 5/2007 | Kwon et al. | 398/72 |
| 2008/0019697 A1* | 1/2008 | Sala et al. | 398/99 |
| 2008/0050116 A1* | 2/2008 | Nakaishi et al. | 398/43 |
| 2008/0050118 A1* | 2/2008 | Haran et al. | 398/63 |
| 2008/0240720 A1* | 10/2008 | Fujii | 398/102 |
| 2009/0123160 A1* | 5/2009 | Yajima et al. | 398/154 |
| 2010/0098407 A1* | 4/2010 | Goswami et al. | 398/5 |
| 2010/0098433 A1* | 4/2010 | Boyd et al. | 398/155 |
| 2010/0272440 A1* | 10/2010 | Haran et al. | 398/67 |
| 2011/0211827 A1* | 9/2011 | Soto et al. | 398/25 |

OTHER PUBLICATIONS

International Search Report directed toward related International Patent Application No. PCT/US2009/060034, Korean Intellectual Property Office, Daejeon, Republic of Korea, mailed Apr. 21, 2010; 3 pages.

International Preliminary Report on Patentability directed toward related International Patent Application No. PCT/US2009/060034, The International Bureau of WIPO, Geneva, Switzerland, mailed Apr. 26, 2011; 5 pages.

* cited by examiner

SYNCHRONIZATION TRANSPORT OVER PASSIVE OPTICAL NETWORKS

RELATED APPLICATION

This application claims the benefit of U.S. Provisional Application No. 61/107,256, filed 21 Oct. 2008.

BACKGROUND

1. Field

This disclosure is generally related to a passive optical network (PON). More specifically, this disclosure is related to transporting a time-division-multiplexing (TDM) clock over a PON.

2. Related Art

IP (internet protocol)-based traffic and TDM-based traffic co-exist on today's networks. Although IP is already pervasive throughout the telecommunications industry, demand for TDM cannot be ignored by service providers.

One driving force for such demand is the corporate-connectivity market, which provides connectivity services to businesses. Note that "Business Services" include voice as well as data, and although voice-over-IP (VoIP) is becoming more important, a significant portion of the corporate-connectivity market will continue to rely on TDM circuits to connect enterprise PBXs (private branch exchange) with IXCs (interexchange carriers) and LECs (local exchange carriers).

Mobile broadband, on the other hand, is growing at an even faster rate, doubling year-over-year through year 2012, due to the increase in laptop Internet traffic and enhanced cellular services, such as web browsing and video distribution. TDM also plays an important role in cellular/mobile backhaul networks. FIG. 1 presents a diagram illustrating a conventional cellular/mobile backhaul architecture (prior art). A cellular/mobile backhaul network 100 includes a RAN (radio-access-network) network center 102, a PSTN (public switched telephone network) 104, a service provider central office 106, and a number of cellular base stations including base stations 108-112. Base stations 108-112 communicate with base station controllers located in central office 106. For example, base station 108 communicates with the corresponding base station controller via link 114. Base station controllers are responsible for aggregating voice and data traffic and maintaining timing and other management synchronizations. Traditionally, the communication between base stations and base station controllers is carried over TDM leased lines, such as a DS0/E1 circuit.

To support the increasing number of subscribers and increasing bandwidth requirements per subscriber, mobile carrier need to increase the bandwidth capacity of their backhaul networks including link 114. A mobile/cellular backhaul network provides connectivity between base stations and base station controllers located at the central office, and carries various types of traffic, including voice traffic (can be either TDM-based voice traffic or VoIP), IP-based data traffic, management signaling traffic, and base station synchronization signals. To solve such a problem, one approach is to increase a mobile backhaul network's capacity by adding more TDM leased lines between the base stations and the base station controllers. However, these TDM circuits are quite expensive. Another approach is to move data traffic (e.g., high-speed downlink packet access (HSDPA) traffic) to a lower cost alternative, such as DSL (digital subscriber line) or cable modem, while continuing to carry voice/cell synchronization traffic over the TDM line. However, most deployed base stations have no capability of separating voice/data traffic to support such an approach. What is needed is a solution that can support TDM-based traffic while providing higher bandwidth at a lower cost

SUMMARY

One embodiment provides an Ethernet Passive Optical Network (EPON) system for clock transport. The system includes a reference clock configured to generate a frequency-reference signal, an optical line terminal (OLT) coupled to the reference clock, and an optical network unit (ONU). The OLT includes a clock generator configured to generate an OLT and EPON transceiver clock synchronized with the frequency-reference signal. The ONU includes an optical transceiver, a clock recovery module, and a clock output mechanism. The optical transceiver is configured to transmit optical signals to and receive optical signals from the OLT. The clock-recovery module is configured to recover the frequency-reference signal from the received optical signals. The clock output mechanism is configured to output the recovered frequency-reference signal, thus facilitating transport of the frequency-reference signal over the EPON.

In a variation on the embodiment, the reference clock is further configured to generate a phase-reference signal, which can be used to obtain phase synchronization between the recovered frequency-reference signal and the original frequency-reference signal.

In a further variation, the OLT is configured to receive the phase-reference signal and communicate phase information associated with the phase-reference signal to the ONU, and the ONU is configured to synchronize the phase of the recovered frequency-reference signal to the phase of the phase-reference signal.

In a further variation, while communicating the phase information, the OLT is configured to broadcast the phase information in an Operation Administration Management (OAM) message. The OAM message includes a count number indicating a Multipoint Control Protocol (MPCP) time corresponding to the phase-reference signal.

In a further variation, the phase-reference signal is a clock signal of 1 pulse-per-second (1 PPS), and the MPCP time corresponds to an edge of the 1 PPS clock signal.

In a further variation, the ONU includes a 1 PPS pulse generator configured to generate 1 PPS pulses, and an edge of the ONU-generated 1 PPS pulses is aligned to the MPCP time plus a predetermined adjustment amount.

In a further variation, the ONU is configured to adjust the received phase-reference signal by compensating for at least one of: propagation delay between the OLT and the ONU, delay incurred to the phase-reference signal on the OLT, and delay incurred to the phase-reference signal on the ONU.

In a variation on this embodiment, the OLT is configured to communicate a time-of-day (TOD) value to the ONU via an OAM message.

BRIEF DESCRIPTION OF THE FIGURES

In the figures, like reference numerals refer to the same figure elements.

DETAILED DESCRIPTION

Figure 1:
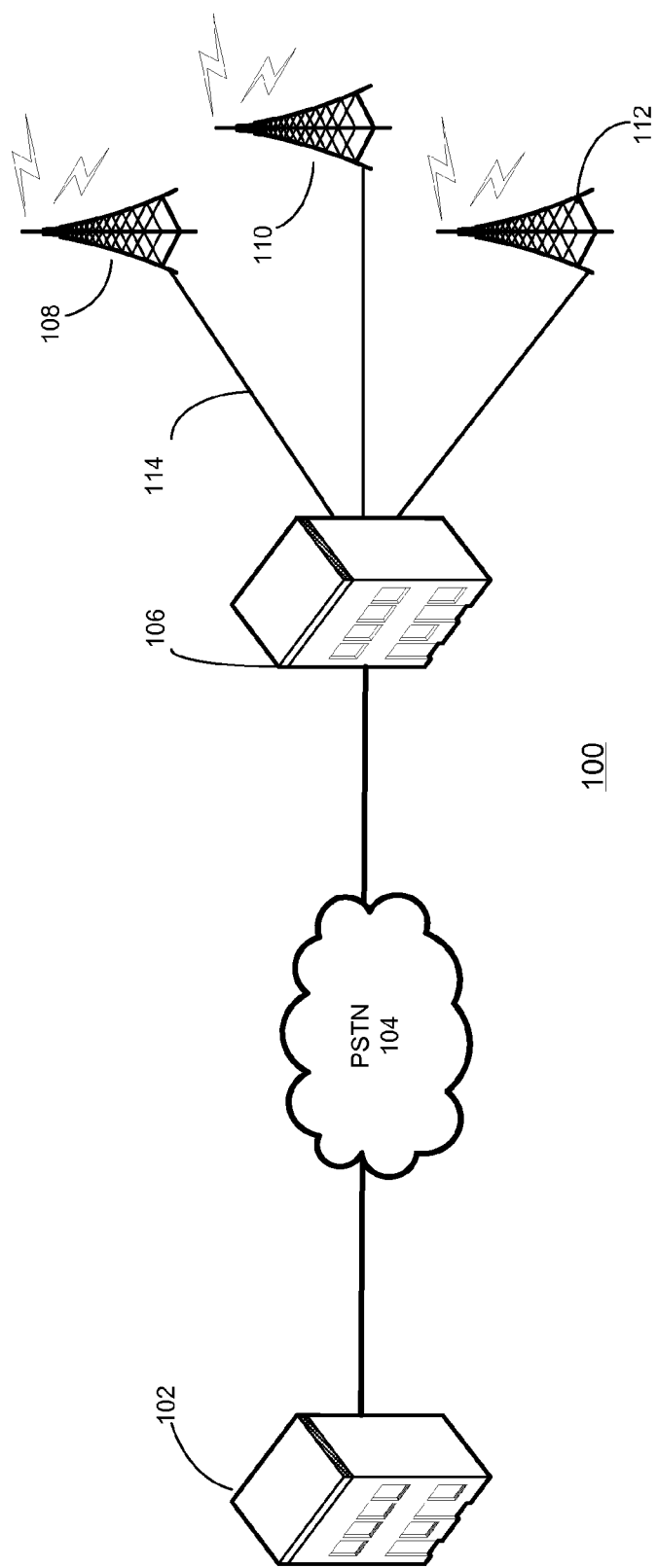
FIG. 1 presents a diagram illustrating a conventional cellular/mobile backhaul architecture (prior art).

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system that can transport a frequency- and phase-synchronized clock over an Ethernet PON (EPON). A TDM network (especially a cellular/mobile network) is circuit based and requires a synchronous central clock throughout the entire system. However, an EPON is packet based and does not facilitate a central clock that is sufficiently frequency- and phase-synchronized. To transport TDM-based traffic over an EPON, the system has to be able to distribute a synchronized TDM clock signal. In embodiments of the present invention, to distribute a reference frequency, the system includes a centralized reference clock that is coupled to an optical line terminal (OLT). The reference clock drives a clock generator located on the OLT to generate an EPON clock signal that can be distributed to a number of optical network terminals (ONUs) coupled to the OLT. A clock recovery module located on an ONU recovers the EPON clock signal, which is frequency synchronized to the reference clock. In addition, a reference phase signal can be delivered from the OLT to the ONU via an Operation Administration Management (OAM) message.

TDM Over PON

Typically, PONs are used in the "first mile" of the network, which provides connectivity between the service provider's central offices and the premises of the customers. The "first mile" is generally a logical point-to-multipoint network, where a central office serves a number of customers. For example, a PON can adopt a tree topology, wherein one trunk fiber couples the central office to a passive optical splitter/combiner. Through a number of branch fibers, the passive optical splitter/combiner divides and distributes downstream optical signals to customers and combines upstream optical signals from customers (see FIG. 2A). Note that other topologies, such as ring and mesh topologies, are also possible.

Transmissions within a PON are typically performed between an optical line terminal (OLT) and optical network units (ONUs). The OLT generally resides in the central office and couples the optical access network to a metro backbone, which can be an external network belonging to, for example, an Internet service provider (ISP) or a local exchange carrier. The ONU can reside in the residence of the customer and couples to the customer's own home network through a customer-premises equipment (CPE).

Figure 2A:
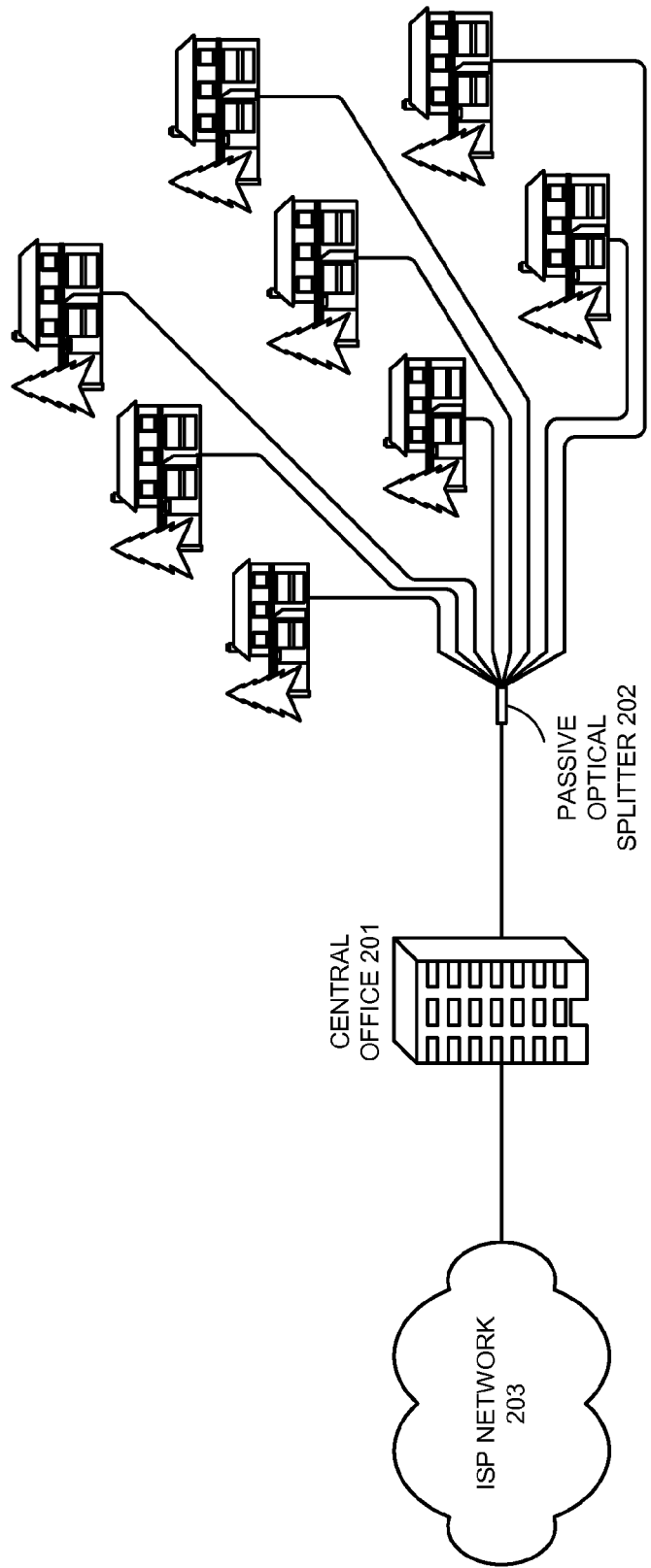
FIG. 2A illustrates a passive optical network including a central office and a number of customers coupled through optical fibers and a passive optical splitter (prior art).

FIG. 2A illustrates a passive optical network including a central office and a number of customers coupled through optical fibers and a passive optical splitter (prior art). A passive optical splitter 202 and optical fibers couple the customers to a central office 201. Passive optical splitter 202 can reside near end-user locations to minimize the initial fiber deployment costs. Central office 201 can couple to an external network 203, such as a metropolitan area network operated by an Internet service provider (ISP). Although FIG. 2A illustrates a tree topology, a PON can also be based on other topologies, such as a logical ring or a logical bus. Note that, although in this disclosure many examples are based on EPONs, embodiments of the present invention are not limited to EPONs and can be applied to a variety of PONs, such as ATM PONs (APONs) and wavelength domain multiplexing (WDM) PONs.

Figure 2B:
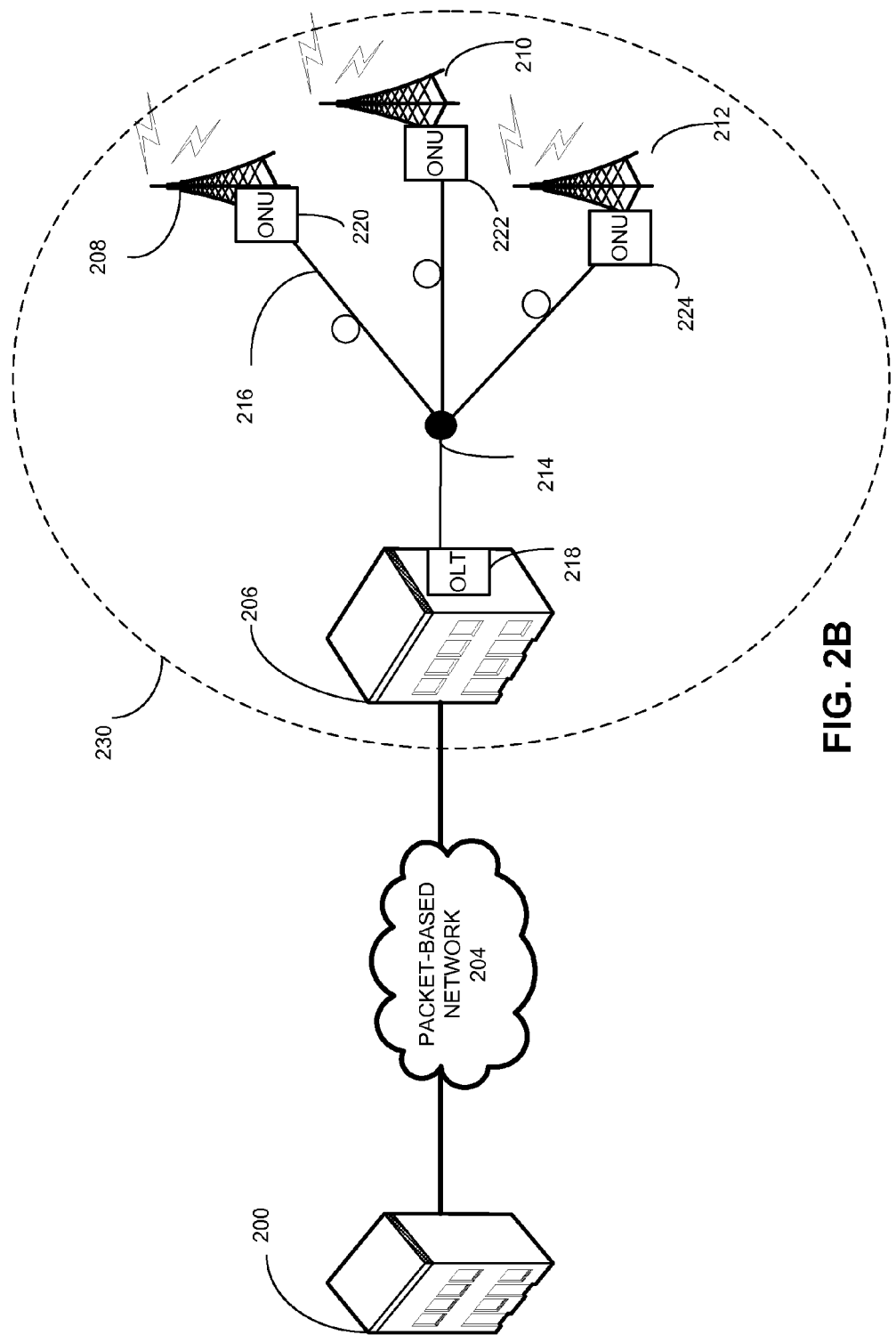
FIG. 2B presents a diagram illustrating an exemplary cellular/mobile backhaul network architecture in accordance with an embodiment of the present invention.

As the amount of data traffic has surged in recent years in the cellular/mobile network, bandwidth requirements for the mobile backhaul network have increased significantly. However, the TDM links connecting the base stations and base station controllers have become the bottleneck for increasing bandwidth. To increase the bandwidth, one solution is to replace the TDM link with an EPON, which takes advantage of the large bandwidth of optical fibers. FIG. 2B presents a diagram illustrating exemplary mobile backhaul network architecture in accordance with an embodiment of the present invention. In FIG. 2B, a network 204 couples to a radio access network (RAN) center 200 and a service provider central office 206. Instead of a conventional circuit-switched network, network 204 is a packet-switched network. Service provider central office 206 couples to a number of base stations, including base stations 208-212, via a passive optical splitter 214, and optical fibers, such as fiber 216. Note that central office 206, passive optical splitter 214, and base stations 208-212 constitutes an EPON 230 with an OLT 218 placed in central office 206, and ONUs 220-224 placed in base stations 208-212, respectively. To transport the TDM traffic originating from the base stations across the PON and the packet-switched network, a circuit emulation technique, such as PWE3 (Pseudowire Emulation Edge to Edge), is implemented.

Figure 3:
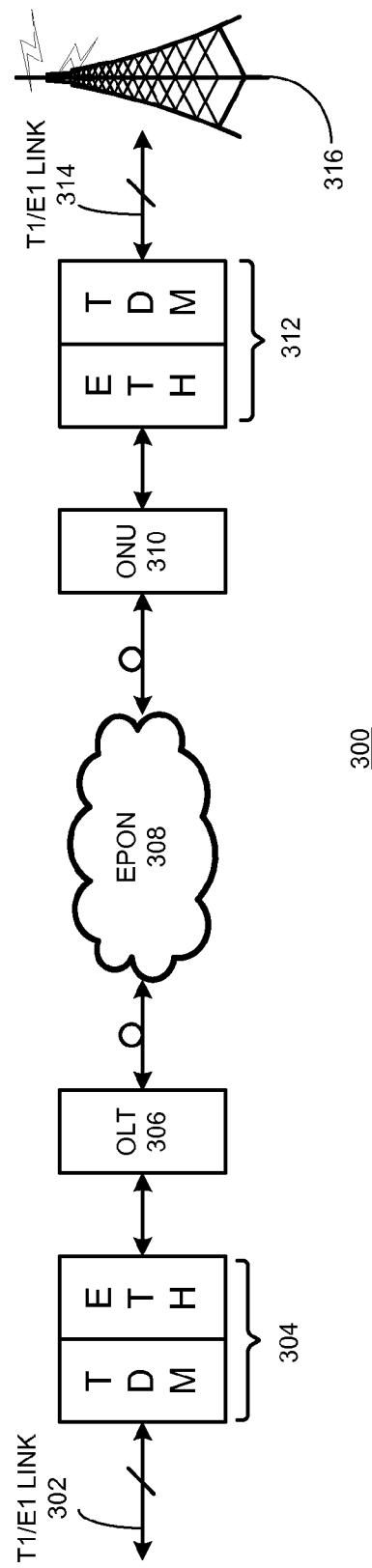
FIG. 3 presents a diagram illustrating an exemplary circuit emulation architecture in accordance with an embodiment of the present invention.

FIG. 3 presents a diagram illustrating an exemplary circuit emulation architecture in accordance with an embodiment of the present invention. Circuit emulation link 300 includes an upper TDM link 302 (which can be a T1/E1 link), a pair of Circuit Emulation System Interwork Function (CESIWF) blocks 304 and 312, an Optical Line Terminal (OLT) 306, an EPON link 308, an Optical Network Unit (ONU) 310, a lower TDM link 314, and a base station 316. CESIWF blocks 304 and 312 both have a TDM interface for coupling to TDM links 302 and 314, and an Ethernet interface for coupling to the EPON. More specifically, CESIWF block 304 couples to OLT 306 via its Ethernet interface, and CESIWF block 312 couples to ONU 310 via its Ethernet interface. In the downstream direction, TDM traffic received from TDM link 302 is converted to Ethernet packets (frames) by CESIWF block 304, and is transported over EPON, which includes OLT 306, EPON link 308, and ONU 310. The transported Ethernet packets are then converted back to TDM traffic by CESIWF block 312, and sent to base station 316 over lower TDM link 314.

However, unlike the TDM system that is synchronous and can provide guaranteed bandwidth, an EPON is inherently asynchronous and lacks bandwidth guarantee. Moreover, base station synchronization is essential for mobile/cellular networks because it can minimize interference between base stations, avoid large number of forced handovers as a result of using a sliding clock, and allow seamless handovers between cells. The base stations can be synchronized via the distribution of a clock signal generated by a stable oscillator, such as the TDM service clock. The system can also distribute a synchronous phase reference, or use time-of-day (ToD) for base station synchronization. Therefore, it is important to have the ability to recover the TDM service clock when emulating the TDM system for cellular/mobile backhaul network. One clock recovery technique is called Adaptive Clock Recovery (ACR). ACR recovers the TDM source clock by averaging the effective clock rate of the bits in the packets transporting the TDM traffic. ACR works well for a system with a relatively narrow range of packet-delay variations (PDV). However, the ACR scheme cannot recover phase information, which is essential in a cellular/mobile system that implements time division duplex (TDD) and useful for clock and data recovery (CDR) operation in a TDM system. Differential Clock Recovery (DCR), on the other hand, is a better candidate for achieving clock synchronization over an emulated TDM link due to its immunity to PDV.

Differential Clock Recovery

Differential Clock Recovery (DCR) regenerates the source clock by relating the current clock to a known clock (e.g., a primary reference clock (PRC)) that is made available at each end of the packet-based network. For example, the difference between the TDM source frequency and the primary reference frequency can be measured and transmitted across the network. At the other end of the network, the TDM source frequency can be regenerated by adding back the primary reference frequency via, for example, PWE3 or circuit emulation system (CES) software and equipment. Therefore, the problem now rests on how to distribute the common clock, including both frequency and phase information, across the network.

One example of frequency distribution is the sampling and line frequencies for SONET/SDH TDM voice transport. Digital voice samples are acquired 8000 times per second (8 kHz). These voice samples are transported in frames of many samples (by North American standards, 24 DS0s in a DS1 plus overhead at 1.544 MHz; 28 DS1s in a DS3 at 44.736 MHz, and so on) leading to network clock frequencies at higher rates. Other technologies may use other reference frequencies, such as 10.000 MHz for synchronizing instrumentation devices.

The reference clock frequency is typically supplied to a central office (or generated there) by high precision and thus expensive equipment. This clock is distributed to many user-side devices by locking the frequency of intermediate equipment to the source frequency. Equipment further down the network locks its clock to the equipment one step closer to the central office. This chain of locking results in a clock frequency at the user side that is the same as the one supplied in the central office—with small errors introduced by the intermediate equipment. Various "stratum levels" are defined for the required precision of the clock, and thus the allowable errors introduced by the intermediate equipment.

Some networks also require a phase reference in addition to a frequency signal. For example, an 8 kHz reference may need to be phase aligned with the network core, in addition to being frequency locked, as there are 15,625 possible phase positions of the 8 khz signal with respect to the recovered 125 MHz downstream clock. Other networks require separate phase references. For example, cellular/mobile networks that implementing TDD often require a 10 MHz frequency reference, and also a 1 Hz phase reference.

Various solutions exist for distributing a synchronized network clock, including implementing a dedicated clock distribution protocol (e.g., Network Time Protocol (NTP)) and using GPS (Global Positioning System) clocks. Implementation of a dedicated clock distribution protocol can be expensive and requires complicated hardware, and the GPS clock may be unavailable under some circumstances, such as in an indoor environment.

Figure 4:
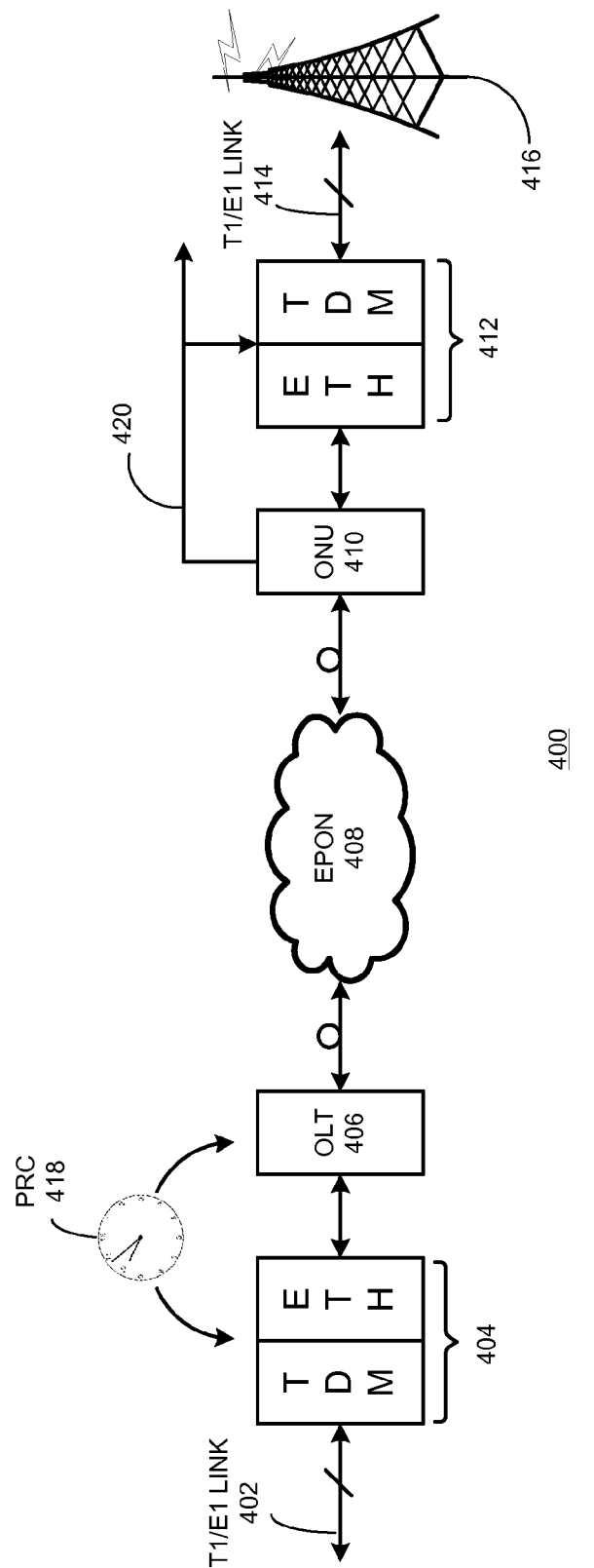
FIG. 4 presents a diagram illustrating an exemplary circuit emulation implementing differential clock recovery (DCR) in accordance with an embodiment of the present invention.

FIG. 4 presents a diagram illustrating an exemplary circuit emulation implementing DCR in accordance with an embodiment of the present invention. Similarly to FIG. 3, circuit emulation link 400 includes an upper TDM link 402, a pair of CESIWF blocks 404 and 412, an OLT 406, an EPON link 408, an ONU 410, a lower TDM link 414, and a base station 416. In addition, a primary reference clock (PRC) 418 couples to CESIWF block 404 and OLT 406. The difference between the TDM source clock and PRC 418 can be calculated at CESIWF block 404, and such information is forwarded to OLT 406. With properly designed hardware (described in more detail later), PRC 418 including both frequency and phase information can be transported over EPON link 408 and recovered by ONU 410, which outputs the recovered reference clock via output 420 to CESIWF block 412 and to other downstream applications. Note that CESIWF block 412 is then able to use the recovered reference clock and the difference to regenerate the TDM source clock, thus ensuring that the TDM clock running on lower TDM link 414 is synchronized with the TDM clock running on upper TDM link 402.

Instead of using a local oscillator, which has no connection to the central office reference clock, to generate the frequencies needed for OLT 406, PRC 418 couples to OLT 406 and provides clock signals to OLT 406. In one embodiment, PRC 418 provides OLT 406 with a high precision 125 MHz clock. In the ONU, the same clock is recovered by the clock recovery module. In one embodiment, the clock recovery module can be supplied within the optical transceiver. The recovered clock frequency can be presented on a pin so that it can be made available to other devices on the ONU board, or taken further down the network if necessary. To produce reference frequencies other than 125 MHz, the recovered clock (RBC) can be prescaled by some integer N before it is output from the ONU chip. For example, to produce an 8 kHz frequency, the 125 MHz RBC can be divided by 15,625. In further embodiments, the system can produce a 10 kHz frequency by first multiplying the 125 MHz RBC by 2 to obtain a 250 MHz signal, and then dividing it by 25 to obtain the 10 kHz signal.

The phase reference is derived from the same clock source as the frequency reference, such as PRC 418. In one embodiment, the phase reference is a 1 per-second phase reference pulse (e.g., a 1 pulse-per-second signal) and is transported from OLT 406 to ONU 410 via an Operation Administration Management (OAM) message. The source pulse is input to OLT 406 from PRC 418 via a general purpose input/output (GPIO) pin. Firmware on OLT 406 notes the Multipoint Control Protocol (MPCP) time of the pulse, and delivers an OAM message to ONU 410 informing it of the next time the pulse should occur. ONU 410 generates a pulse at a corresponding MPCP time according to the OAM message. Note that the MPCP time of EPON has a resolution of one time quantum (TQ), which is 16 ns. The ONU-generated pulse is located within ±8 TQ of the time of the source pulse due to the incidental variable delay introduced by the OLT.

Figure 5:
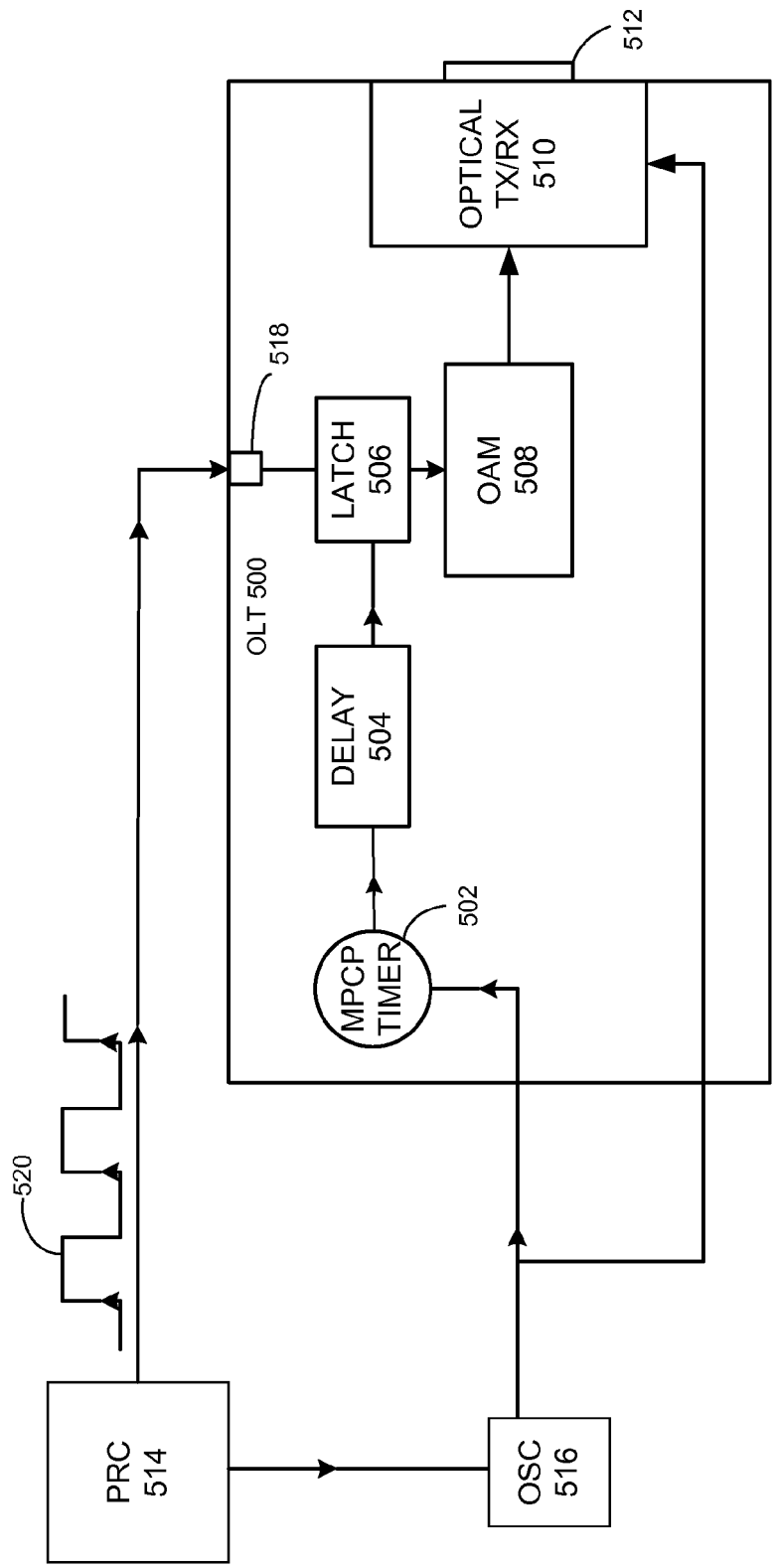
FIG. 5 presents a diagram illustrating an exemplary architecture of a clock-transport OLT in accordance with an embodiment of the present invention.

FIG. 5 presents a diagram illustrating an exemplary architecture of a clock-transport OLT in accordance with an embodiment of the present invention. OLT 500 includes an MPCP timer 502, an incidental delay module 504, a latch 506, an OAM message generator 508, an optical transceiver 510, an optical interface 512, and a GPIO pin 518. Optical transceiver 510 transmits optical signals to and receives optical signals from downstream ONUs via optical interface 512, which can be a fiber connector. Note that because conventional 125 MHz Ethernet oscillators are not precise enough for cellular/mobile network synchronization, and a local oscillator cannot synchronize with a reference clock, OLT 500 does not have a local oscillator. The clock signal that drives a laser of optical transceiver 510 is provided by an off-OLT precision oscillator 516 coupled to a PRC 514. In one embodiment, one or more timing cards are included in an OLT shelf that contains many OLTs. The timing card accepts signals from PRC 514 and distributes the clock over the backplane of the OLT line cards. In one embodiment, a lower frequency (lower than 125 MHz) is generated by the timing card and carried to the line card, and a local phase-locked loop (PLL) is used to lock to the reference frequency and to multiply the lower frequency to the 125 MHz EPON frequency.

During operation, the clock signal generated by precision oscillator 516 is provided to MPCP timer 502, which generates OLT MPCP time. According to IEEE standard 802.3ah, the MPCP constitutes an absolute timing model, in which a global clock exists in the OLT, and the ONUs set their local clocks to the OLT clocks using time stamps in the MPCP control messages (such as GATE and REPORT). The MPCP time is recorded as a 32-bit integer indicating the value of a TQ counter.

The phase reference is also distributed as a clock from PRC 514. In one embodiment, the phase reference is a 1 pulse-per-second (1 PPS) signal 520. The phase reference clock is input to OLT 500 via a GPIO pin 518, which triggers an interrupt on the clock edges. When GPIO pin 518 triggers, latch 506 latches the current MPCP time (count number of MPCP timer 502) for that clock edge. Note that delay module 504 provides incidental delays. The latched MPCP time is sent to OAM message generator 508, which calculates the next pulse time. In one embodiment, the next pulse time is calculated by adding the latched MPCP time with 1 second (62,500,000 TQ) and a fixed default adjustment factor for adjusting delay. In one embodiment, OAM message generator 508 is implemented using firmware. The OAM message is then broadcast to downstream ONUs via optical transceiver 510 and optical interface 512. The downstream ONU are then able to receive the OAM message and program their hardware to generate a clock edge at the proper MPCP time. In addition to synchronizing phase, in one embodiment, the 1 PPS phase signal can also be used to synchronize a remote oscillator to the same frequency, which can be used for DCR.

Figure 6:
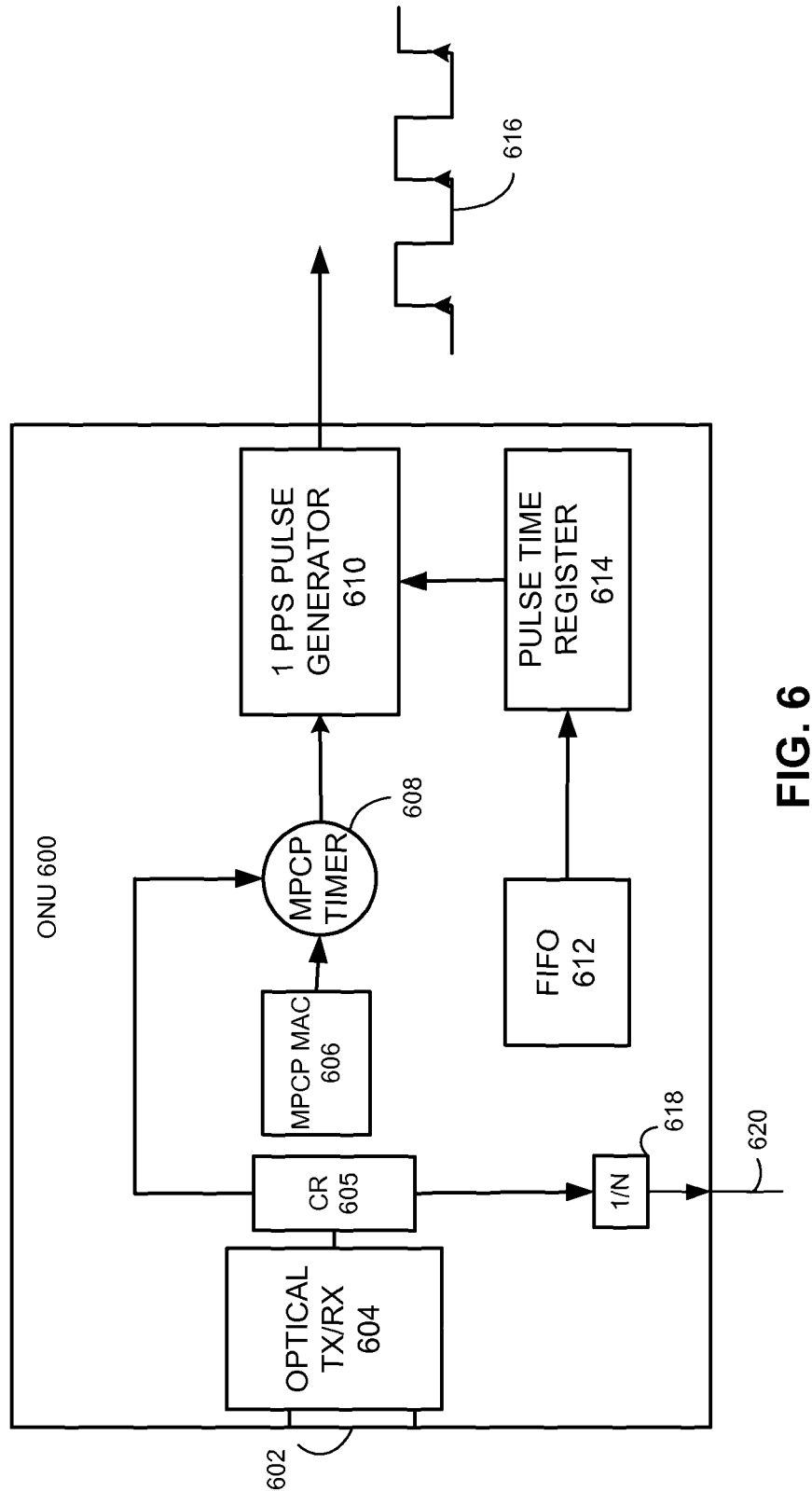
FIG. 6 presents a diagram illustrating an exemplary architecture of a clock-transport ONU in accordance with an embodiment of the present invention.

FIG. 6 presents a diagram illustrating an exemplary architecture of a clock-transport ONU in accordance with an embodiment of the present invention. ONU 600 include an optical interface 602, an optical transceiver 604, a clock recovery (CR) module 605, an MPCP Media Access Control (MAC) module 606, an MPCP timer 608, a 1 PPS pulse generator 610, a processor first-in-first-out (FIFO) buffer 612, a pulse time register 614, a clock divider 618, and a clock output pin 620.

During operation, optical transceiver 604 receives downstream (from an OLT to the ONU) traffic from an OLT via optical interface 602. Clock recovery module 605 recovers the bit clock from the downstream data signal. The recovered clock is sent to a clock divider 618 that feeds to a clock output pin 620, which outputs clock signal at a higher frequency. According to the MPCP protocol, MPCP MAC 606 synchronizes ONU-side MPCP timer 608 to OLT-side MPCP timer 502 based on the time stamps in the MPCP control messages. Using this process, the dynamic error of local MPCP timer 608 is effectively quantized and confined in two neighboring TQs.

The next pulse time of the 1 PPS pulse extracted from the received OAM message is stored in processor FIFO 612. For every received OAM message containing the 1 PPS phase information, the ONU-side firmware adjusts the next pulse time to compensate for fiber propagation latency, OLT-side latency (including non-default optics, 1 PPS signal propagation delay, etc.), and ONU-side latency (including non-default optics, 1 PPS signal propagation delay, etc.). The compensated result is then used to program 1 PPS pulse time register 614. 1 PPS pulse generator 610 generates 1 PPS pulse signal output 616 by aligning the rising edge of the next pulse with the programmed pulse time (stored in pulse time register 614) relative to local MPCP timer 608's counter value. Note that ONU-generated 1 PPS pulse signal 616 has a rising edge corresponding to the rising edge of the 1 PPS pulse signal 520 generated by PRC 514. Therefore, a reference phase signal is successfully transported over the EPON. In addition to the 1 PPS pulse signal with 50% duty cycle, other pulse trains are also possible as a reference phase signal.

In addition to clock frequency and clock phase, some applications require the real time-of-day (TOD) to be set, that is, time in the form of a data and "wall clock" time. Once set, such devices typically track the progress of time with an internal clock locked to a frequency or phase reference. The TOD does not need to be regularly delivered, but just set once. Ongoing, irregular maintenance of the TOD can be required, as when leap seconds are inserted into the date by world standard organizations.

To distribute the TOD, the master PRC sends a TOD command string to the host controller through an arbitrary communication channel and then the host issues the string through the host interface for distribution. In one embodiment, the TOD is transported over the EPON in an OAM message containing a byte string representing the date and time. This string is duplicated at the ONU serial port. The host, in turn, forwards the string as it is received from the TOD source, though it may reformat the data to adapt one interface standard to another. If the propagation delay for the TOD is unacceptable, it is possible to combine the in-band TOD distribution with the 1 PPS precision time alignment scheme. In one embodiment, the actual TOD is marked by the edge of the 1 PPS pulse output, while the TOD string simply lets the remote clock know which time the 1 PPS pulse edge represents.

In addition to being used for TDM emulation, the aforementioned EPON clock transport method can also be used in other network applications where a synchronized network clock is needed in a packet-based network. Such applications include field instrumentation, legacy TDM services such as T1/E1, wireless backhaul of emerging technologies such as femtocell, 3GPP LTE ($3^{rd}$ Generation Partnership Project Long Term Evolution), and WiMax. In addition, this EPON clock transport technique that transports both frequency and phase information can also be used for other various applications that require a synchronized clock, such as those applications that require a boundary clock defined by the IEEE-1588 standard.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. An Ethernet Passive Optical Network (EPON) system for clock transport, comprising:
   a reference clock configured to generate a frequency-reference signal and a phase-reference signal;
   an optical line terminal (OLT) configured:
      to generate an OLT clock based on and different from the frequency-reference signal, and
      to transmit phase information relating to the frequency-reference signal in Operation Administration Management (OAM) message having a count number indicating a Multipoint Control Protocol (MPCP) time corresponding to the phase-reference signal; and
   an optical network unit (ONU) configured:
      to recover the frequency-reference signal from the phase information,
      to synchronize a phase of, the recovered frequency-reference signal to a phase of the phase-reference signal, and
      to output the recovered frequency-reference signal to facilitate transport of the frequency-reference signal over the EPON system.

2. The system of claim 1, wherein the phase-reference signal is a clock signal of 1 pulse-per-second (1 PPS), and
   wherein the MPCP time corresponds to an edge of the 1 PPS clock signal.

3. The system of claim 2, wherein the ONU further comprises:
   a 1 PPS pulse generator configured to generate a 1 PPS pulse, and
   wherein an edge of the generated 1 PPS pulse is aligned to the MPCP time plus a predetermined adjustment amount.

4. The system of claim 1, wherein the ONU is further configured to adjust the phase-reference signal to compensate for at least one of:
   propagation delay between the OLT and the ONU;
   delay incurred to the phase-reference signal on the OLT; or
   delay incurred to the phase-reference signal on the ONU.

5. The system of claim 1, wherein the OLT is further configured to communicate a time-of-day (TOD) value to the ONU via the OAM message.

6. An optical line terminal (OLT) for clock transport in an Ethernet Passive Optical Network (EPON), comprising:
   a clock generator, coupled to a reference clock, configured to generate an OLT clock based on a frequency-reference signal corresponding to the reference clock;
   an optical transceiver, coupled to the clock generator, configured to transmit the OLT clock to a downstream optical network unit (ONU); and
   a phase-synchronization mechanism, coupled to the reference clock, configured to receive a phase-reference signal associated with the frequency-reference signal and to broadcast the phase information in an Operation Administration Management (OAM) message having a count number indicating a Multipoint Control Protocol (MPCP) time corresponding to the phase-reference signal.

7. The OLT of claim 6, wherein the phase-reference signal is a clock signal of 1 pulse-per-second (1 PPS), and
   wherein the MPCP time corresponds to an edge of the 1 PPS clock signal.

8. The OLT of claim 6, wherein the optical transceiver is further configured to communicate a time-of-day (TOD) value to the ONU via the OAM message.

9. An optical network unit (ONU) for clock transport in an Ethernet Passive Optical Network (EPON), comprising:
   an optical transceiver configured to receive an optical signal from an upstream optical line terminal (OLT);
   a clock-recovery module, coupled to the optical transceiver, configured to:
      recover a frequency-reference signal from the received optical signal, and
      receive phase information associated with a phase-reference signal from an Operation Administration Management (OAM) message broadcast by the upstream OLT, the OAM message including a count number indicating a Multipoint Control Protocol (MPCP) time corresponding to the phase-reference signal;
   a phase reference mechanism configured to synchronize a phase of the recovered frequency-reference signal to a phase of the phase-reference signal based on the received phase information; and
   a clock output mechanism configured to output the recovered frequency-reference signal to facilitate transport of the frequency-reference signal over the EPON.

10. The ONU of claim 9, wherein the phase-reference signal is a clock signal of 1 pulse-per-second (1 PPS), and
    wherein the MPCP time corresponds to an edge of the 1 PPS clock signal.

11. The ONU of claim 10, wherein the ONU further comprises:
    a 1 PPS pulse generator configured to generate a 1 PPS pulse,
    wherein an edge of the generated 1 PPS pulse is aligned to the MPCP time plus a predetermined adjustment amount based on the recovered phase information.

12. The ONU of claim 9, wherein the phase reference mechanism is further configured to adjust the phase-reference signal to compensate for at least one of:
  propagation delay between the upstream OLT and the ONU;
  delay incurred to a corresponding phase-reference signal on the upstream OLT; or
  delay incurred to a corresponding phase-reference signal on the ONU.

13. The ONU of claim 9, wherein the optical transceiver is further configured to receive a time-of-day (TOD) value from the upstream OLT via the OAM message.

14. A method for receiving a clock in an Ethernet Passive Optical Network (EPON), comprising:
  receiving an optical signal from an optical line terminal (OLT);
  recovering a frequency-reference signal from the received optical signal;
  receiving phase information associated with a phase-reference signal from an Operation Administration Management (OAM) message broadcast by the OLT, the OAM message including a count number indicating a Multipoint Control Protocol (MPCP) time corresponding to the phase-reference signal;
  synchronizing a phase of the recovered frequency-reference signal to a phase of the phase-reference signal based on the received phase information; and
  generating an output based on the recovered frequency-reference signal.

15. The system of claim 1, wherein the phase information is a 1 pulse-per-second (1 PPS) signal and is transported from the OLT to the ONU via the OAM message.

16. The system of claim 1, wherein the ONU is further configured to adjust a next pulse time to compensate for fiber propagation latency, OLT-side latency, and ONU side latency based on the received OAM message.

17. The system of claim 16, wherein the ONU comprises:
  a pulse generator configured to align a rising edge of a next pulse with a programmed pulse time stored in a register.

* * * * *

UNITED STATES PATENT AND TRADEMARK OFFICE
CERTIFICATE OF CORRECTION

PATENT NO. : 8,942,561 B2  
APPLICATION NO. : 12/574083  
DATED : January 27, 2015  
INVENTOR(S) : Boyd et al.

Page 1 of 1

It is certified that error appears in the above-identified patent and that said Letters Patent is hereby corrected as shown below:

In the Claims

Column 9, line 43, Claim 1, please replace "in Operation" with --in an Operation--.

Column 9, line 51, Claim 1, please replace "of, the" with --of the--.

Signed and Sealed this
Twenty-eighth Day of April, 2015

Michelle K. Lee
*Director of the United States Patent and Trademark Office*